United States Patent
Aryafar et al.

(10) Patent No.: US 12,319,425 B2
(45) Date of Patent: Jun. 3, 2025

(54) MULTI-CORE ACOUSTIC PANEL FOR AN AIRCRAFT PROPULSION SYSTEM

(71) Applicant: Rohr, Inc., Chula Vista, CA (US)

(72) Inventors: Novin Aryafar, San Diego, CA (US); Clare McGlory, San Diego, CA (US); Jose S. Alonso-Miralles, Chula Vista, CA (US)

(73) Assignee: ROHR, INC., Chula Vista, CA (US)

( * ) Notice: Subject to any disclaimer, the term of this patent is extended or adjusted under 35 U.S.C. 154(b) by 232 days.

(21) Appl. No.: 18/093,221

(22) Filed: Jan. 4, 2023

(65) Prior Publication Data

US 2023/0211890 A1 Jul. 6, 2023

Related U.S. Application Data

(60) Provisional application No. 63/296,352, filed on Jan. 4, 2022.

(51) Int. Cl.
*F02C 7/24* (2006.01)
*B64D 33/04* (2006.01)

(52) U.S. Cl.
CPC ............... *B64D 33/06* (2013.01); *F02C 7/24* (2013.01); *F05D 2260/96* (2013.01)

(58) Field of Classification Search
CPC ............... F05D 2260/96; B64D 29/00; B64D 2033/0206; B64D 33/06; B64C 1/40; F02K 1/827; F02C 7/045; F02C 7/24
See application file for complete search history.

(56) References Cited

U.S. PATENT DOCUMENTS

| | | | |
|---|---|---|---|
| 3,542,152 A | 11/1970 | Adamson |
| 3,640,357 A | 2/1972 | Kitching |
| 4,240,519 A | 12/1980 | Wynosky |
| 4,944,362 A | 7/1990 | Motsinger |

(Continued)

FOREIGN PATENT DOCUMENTS

| | | |
|---|---|---|
| CN | 104175616 B | 6/2016 |
| CN | 104723616 B | 7/2016 |

(Continued)

OTHER PUBLICATIONS

Eastwood et al, "MBF2301 Installation and Inspection Specification for COMPOSI-LOK 3 Blind Fasteners", Monogram Aerospace Fasteners, Dec. 11, 2006.

(Continued)

*Primary Examiner* — Todd E Manahan
*Assistant Examiner* — Rodolphe Andre Chabreyrie
(74) *Attorney, Agent, or Firm* — Getz Balich LLC

(57) ABSTRACT

An apparatus is provided for an aircraft propulsion system. This apparatus includes an acoustic panel and a mount. The acoustic panel includes a perforated face skin, a back skin, a perforated intermediate layer, a first cellular core and a second cellular core. The first cellular core includes a first section and a second section. The first section is between and is connected to the perforated face skin and the perforated intermediate layer. The second section is between and is connected to the perforated face skin and the back skin. The second cellular core is between and is connected to the perforated intermediate layer and the back skin. The mount is attached to the back skin along the second section.

18 Claims, 10 Drawing Sheets

(56) References Cited

U.S. PATENT DOCUMENTS

| | | |
|---|---|---|
| 5,884,472 A | 3/1999 | Presz, Jr. |
| 6,123,170 A | 9/2000 | Porte |
| 6,274,216 B1 | 8/2001 | Gonidec |
| 6,536,556 B2 | 3/2003 | Porte |
| 7,051,489 B1 | 5/2006 | Swiszcz |
| 8,043,690 B2 | 10/2011 | Hand |
| 8,302,733 B2 | 11/2012 | Peiffer |
| 8,727,072 B2 | 5/2014 | Ayle |
| 8,955,643 B2 | 2/2015 | Liu |
| 9,051,054 B2 | 6/2015 | Vauchel |
| 9,051,899 B2 | 6/2015 | Malot |
| 9,062,610 B2 | 6/2015 | Morvant |
| 9,261,008 B2 | 2/2016 | Mecuson |
| 9,403,338 B2 | 8/2016 | Tuczek |
| 9,469,985 B1 | 10/2016 | Ichihashi |
| 9,592,918 B2 | 3/2017 | Yu |
| 9,704,467 B1 | 7/2017 | Nampy |
| 9,708,930 B2 | 7/2017 | Koroly |
| 9,732,677 B1 | 8/2017 | Chien |
| 9,764,818 B2 | 9/2017 | Nampy |
| 10,332,501 B2 | 6/2019 | Lin |
| 10,695,986 B2 | 6/2020 | Gurney |
| 10,731,662 B2 | 8/2020 | Crutchfield |
| 10,907,651 B2 | 2/2021 | Crutchfield |
| 2007/0034447 A1 | 2/2007 | Proscia |
| 2008/0020176 A1 | 1/2008 | Ayle |
| 2008/0020188 A1 | 1/2008 | Gale |
| 2010/0236862 A1* | 9/2010 | Sternberger ............ F02C 7/045 |
| | | 181/213 |
| 2013/0306403 A1 | 11/2013 | Todorovic |
| 2014/0349082 A1 | 11/2014 | Tien |
| 2015/0367953 A1 | 12/2015 | Yu |
| 2017/0028667 A1 | 2/2017 | Fach |
| 2017/0182723 A1 | 6/2017 | Calisch |
| 2017/0225764 A1 | 8/2017 | Nampy |
| 2017/0301334 A1 | 10/2017 | Nampy |
| 2018/0142621 A1 | 5/2018 | Biset |
| 2018/0142622 A1 | 5/2018 | Biset |
| 2018/0258955 A1 | 9/2018 | Levasseur |
| 2019/0161199 A1* | 5/2019 | Lacko ................ B64D 33/02 |
| 2019/0270504 A1 | 9/2019 | Cedar |
| 2020/0003230 A1 | 1/2020 | Alonso-Miralles |
| 2020/0063691 A1 | 2/2020 | Kruckenberg |
| 2020/0088135 A1 | 3/2020 | Lopez |
| 2020/0103139 A1 | 4/2020 | Schiller |
| 2020/0141357 A1 | 5/2020 | Murray |
| 2020/0191091 A1* | 6/2020 | Gurvich ............... G10K 11/168 |
| 2020/0309028 A1 | 10/2020 | Murugappan |
| 2020/0386187 A1* | 12/2020 | Kelford .................... B32B 3/12 |
| 2021/0049993 A1 | 2/2021 | Cazeaux |

FOREIGN PATENT DOCUMENTS

| | | |
|---|---|---|
| EP | 2844463 B1 | 12/2017 |
| EP | 2669501 B1 | 2/2020 |
| EP | 3364407 B1 | 9/2021 |
| EP | 3489947 B1 | 1/2022 |
| GB | 1406844 A | 9/1975 |
| GB | 2550926 B | 7/2018 |
| JP | 5151535 | 2/2013 |
| WO | 2014200499 A1 | 12/2014 |

OTHER PUBLICATIONS

European Search Report for EP23150346.7 dated Jun. 2, 2023.

* cited by examiner

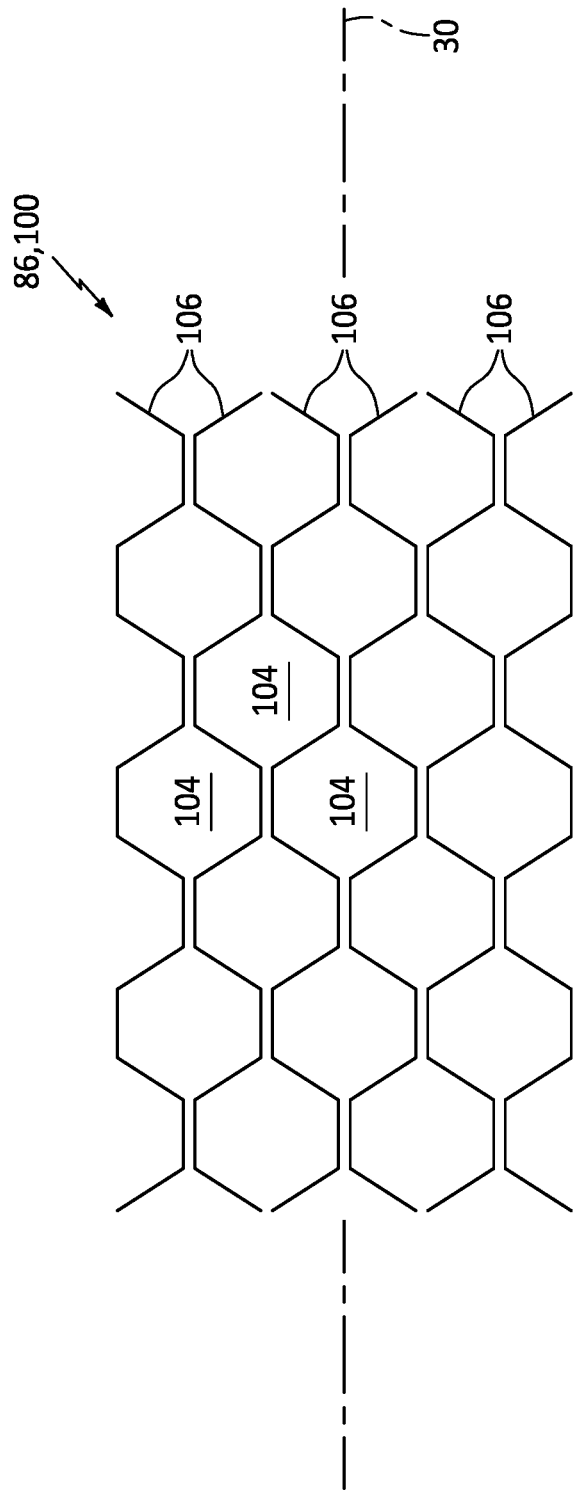

MULTI-CORE ACOUSTIC PANEL FOR AN AIRCRAFT PROPULSION SYSTEM

This application claims priority to U.S. Patent Appln. No. 63/296,352 filed Jan. 4, 2022 which is hereby incorporated herein by reference in its entirety.

BACKGROUND

1. Technical Field

This disclosure relates generally to an aircraft propulsion system and, more particularly, to sound attenuation for the aircraft propulsion system.

2. Background Information

An aircraft propulsion system directs air into a fan section of a gas turbine engine through an inlet flowpath. Sound waves (e.g., noise) generated by the fan section during propulsion system operation may travel out of the aircraft propulsion system through the inlet flowpath. An inner barrel forming an outer peripheral boundary of the inlet flowpath may be configured with structures for attenuating sound waves. While known sound attenuating structures have various advantages, there is still room in the art for improvement. In particular, there is a need in the art for sound attenuation structures for an inner barrel (as well as other structures) capable of attenuating low frequency sound waves while maintaining structural integrity.

SUMMARY OF THE DISCLOSURE

According to an aspect of the present disclosure, an apparatus is provided for an aircraft propulsion system. This apparatus includes an acoustic panel and a mount. The acoustic panel includes a perforated face skin, a back skin, a perforated intermediate layer, a first cellular core and a second cellular core. The first cellular core includes a first section and a second section. The first section is between and is connected to the perforated face skin and the perforated intermediate layer. The second section is between and is connected to the perforated face skin and the back skin. The second cellular core is between and is connected to the perforated intermediate layer and the back skin. The mount is attached to the back skin along the second section.

According to another aspect of the present disclosure, another apparatus is provided for an aircraft propulsion system. This apparatus includes an inner barrel, and the inner barrel includes a multi-degree of freedom acoustic panel and a mount. The multi-degree of freedom acoustic panel includes a back skin, a first cellular core and a second cellular core axially and circumferentially overlapping the first cellular core. The first cellular core includes a plurality of first core chambers. A first of the first core chambers is configured with a first chamber sectional geometry in a first chamber reference plane. The second cellular core includes a plurality of second core chambers. A first of the second core chambers is configured with a second chamber sectional geometry in a second chamber reference plane that is parallel with the first chamber reference plane. The second chamber sectional geometry is different than the first chamber sectional geometry. The mount is attached to the back skin.

According to still another aspect of the present disclosure, another apparatus is provided for an aircraft propulsion system. This apparatus includes a multi-degree of freedom acoustic panel and a mount. The multi-degree of freedom acoustic panel includes a perforated face skin, a back skin and a cellular core between the perforated face skin and the back skin. The cellular core includes a first section and a second section. The first section is connected to the perforated face skin and is spaced from the back skin. The second section is connected to the perforated face skin and the back skin. The mount is mechanically fastened to the back skin along the second section with a plurality of fasteners. A first of the fasteners projects through the back skin and partially into the cellular core.

A first section of the back skin may be connected to the first cellular core. A second section of the back skin may be connected to the second cellular core.

The mount may be attached to the back skin by a plurality of fasteners.

A first of the fasteners may project partially into the second section from the back skin.

The mount may be configured as or otherwise include a flange.

The perforated intermediate layer may extend longitudinally to an interface between the second section and the back skin.

The first cellular core may include a plurality of first core chambers. A first of the first core chambers in the first section may be fluidly coupled with one or more first perforations in the perforated face skin and one or more first perforations in the perforated intermediate layer. The second cellular core may include a plurality of second core chambers. A first of the second core chambers may be fluidly coupled with the first of the first core chambers through the one or more first perforations in the perforated intermediate layer.

A second of the first core chambers may be fluidly coupled with one or more second perforations in the perforated face skin and one or more second perforations in the perforated intermediate layer. The first of the second core chambers may be fluidly coupled with the second of the first core chambers through the one or more second perforations in the perforated intermediate layer.

The first of the first core chambers may be configured with a first chamber sectional geometry in a first chamber reference plane. The first of the second core chambers may be configured with a second chamber sectional geometry in a second chamber reference plane that is parallel with the first chamber reference plane. The second chamber sectional geometry may be different than the first chamber sectional geometry.

The first chamber sectional geometry may have a rectangular shape. In addition or alternatively, the second chamber sectional geometry may have a parallelogram shape.

The first chamber sectional geometry may have a hexagonal shape. In addition or alternatively, the second chamber sectional geometry may have a rectangular shape.

The first of the first core chambers may be configured with a first chamber sectional geometry in a first chamber reference plane. The first of the second core chambers may be configured with a second chamber sectional geometry in a second chamber reference plane that is parallel with the first chamber reference plane. The second chamber sectional geometry may be common with the first chamber sectional geometry.

The second cellular core may include a plurality of corrugations. A first of the corrugations may include a first panel and a second panel. The first of the corrugations may be connected to the back skin at an interface between the first panel and the second panel. The first panel may be connected to the perforated intermediate layer at a first location. The second panel may be connected to the perforated intermediate layer at a second location.

The first panel may be angularly offset from the back skin by an acute angle. The second panel may be angularly offset from the first panel at the interface between the first panel and the second panel by an acute angle.

The first panel may be configured as a non-perforated panel. In addition or alternatively, the second panel may be configured as a perforated panel.

The first cellular core may be configured as or otherwise include a honeycomb core.

The apparatus may also include a nacelle inner barrel. The nacelle inner barrel may include the acoustic panel.

The apparatus may also include a fan case. The acoustic panel may be next to the fan case. The acoustic panel may be connected to the fan case through the mount.

The present disclosure may include any one or more of the individual features disclosed above and/or below alone or in any combination thereof.

The foregoing features and the operation of the invention will become more apparent in light of the following description and the accompanying drawings.

BRIEF DESCRIPTION OF THE DRAWINGS

FIG. 4 is a partial illustration of an inner cellular core for the acoustic panel.

DETAILED DESCRIPTION

Figure 1:
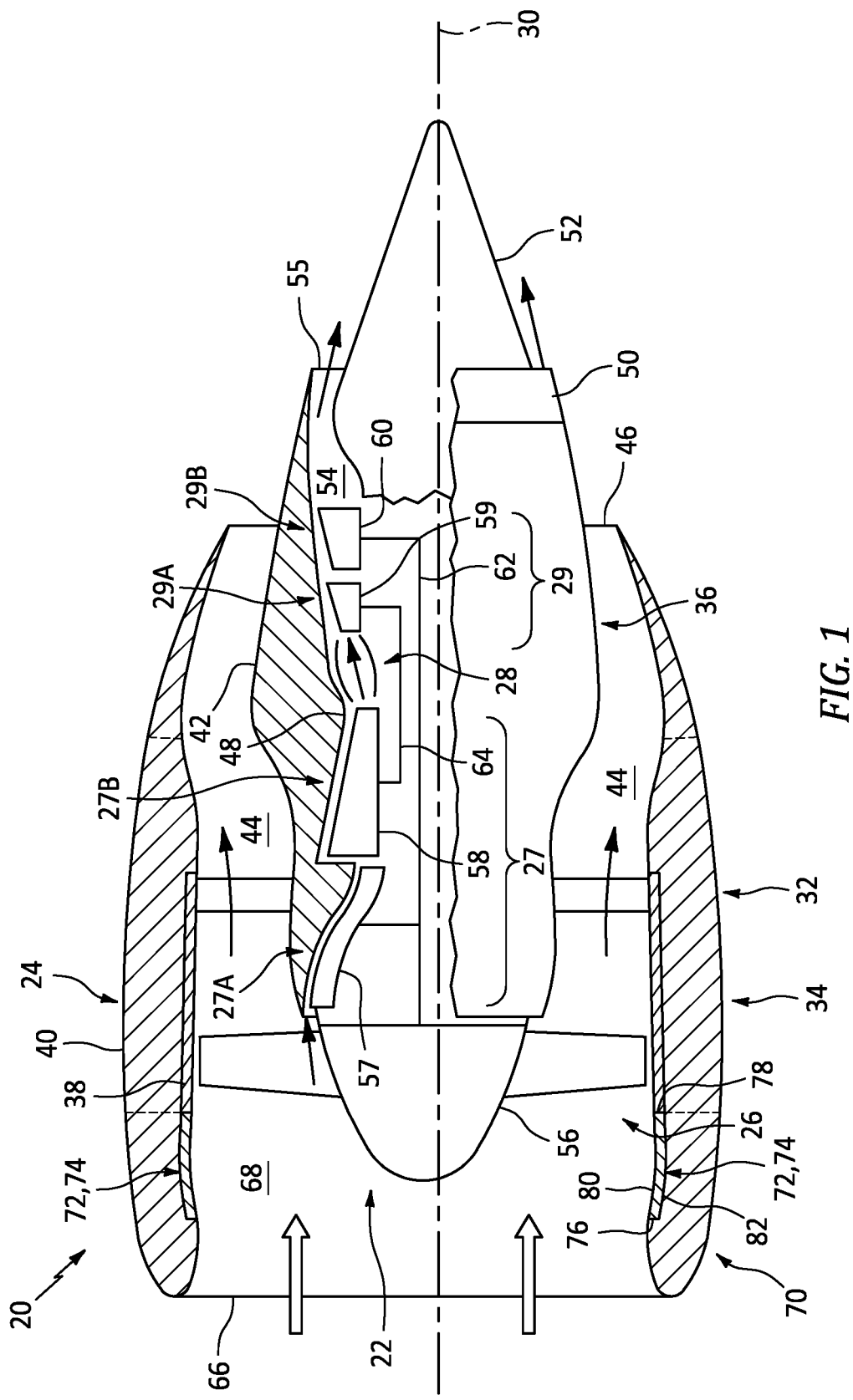
FIG. 1 is a side cutaway illustration of an aircraft propulsion system.

FIG. 1 illustrates a propulsion system 20 for an aircraft such as, but not limited to, a commercial airliner or cargo plane. This aircraft propulsion system 20 includes a gas turbine engine 22 and a nacelle 24.

The gas turbine engine 22 may be configured as a high-bypass turbofan engine. The gas turbine engine 22 of FIG. 1, for example, includes a fan section 26, a compressor section 27, a combustor section 28 and a turbine section 29. The compressor section 27 may include a low pressure compressor (LPC) section 27A and a high pressure compressor (HPC) section 27B. The turbine section 29 may include a high pressure turbine (HPT) section 29A and a low pressure turbine (LPT) section 29B.

The engine sections 26-29 are arranged sequentially along an axial centerline 30 (e.g., a rotational axis) of the gas turbine engine 22 within an aircraft propulsion system housing 32. This propulsion system housing 32 includes an outer housing structure 34 and an inner housing structure 36.

The outer housing structure 34 includes an outer case 38 (e.g., a fan case) and an outer structure 40 of the nacelle 24; e.g., an outer nacelle structure. The outer case 38 houses at least the fan section 26. The outer nacelle structure 40 houses and provides an aerodynamic cover for the outer case 38. The outer nacelle structure 40 also covers a portion of an inner structure 42 of the nacelle 24; e.g., an inner nacelle structure, which may also be referred to as an inner fixed structure. More particularly, the outer nacelle structure 40 axially overlaps and extends circumferentially about (e.g., completely around) the inner nacelle structure 42. The outer nacelle structure 40 and the inner nacelle structure 42 thereby at least partially or completely form a bypass flowpath 44. This bypass flowpath 44 extends axially along the centerline 30 within the aircraft propulsion system 20 to a bypass nozzle outlet 46, where the bypass flowpath 44 is radially between the nacelle structures 40 and 42.

The inner housing structure 36 includes an inner case 48 (e.g., a core case) and the inner nacelle structure 42. The inner case 48 houses one or more of the engine sections 27A-29B, which engine sections 27A-29B may be collectively referred to as an engine core. The inner nacelle structure 42 houses and provides an aerodynamic cover for the inner case 48. A downstream/aft portion of the inner housing structure 36 such as, for example, a core nozzle 50 of the inner nacelle structure 42 also covers at least a portion of an exhaust center body 52. More particularly, the inner nacelle structure 42 and its core nozzle 50 axially overlap and extend circumferentially about (e.g., completely around) the exhaust center body 52. The core nozzle 50 and the exhaust center body 52 collectively form a downstream/aft portion of a core flowpath 54. This core flowpath 54 extends axially within the aircraft propulsion system 20, through the engine sections 27A-29B, to a core nozzle outlet 55 at a downstream/aft end of the aircraft propulsion system 20.

Each of the engine sections 26, 27A, 27B, 29A and 29B of FIG. 1 includes a respective bladed rotor 56-60. Each of these bladed rotors 56-60 includes a plurality of rotor blades arranged circumferentially around and connected to one or more respective rotor disks.

The fan rotor 56 and the LPC rotor 57 are connected to and driven by the LPT rotor 60 through a low speed shaft 62. The HPC rotor 58 is connected to and driven by the HPT rotor 59 through a high speed shaft 64. The shafts 62 and 64 are rotatably supported by a plurality of bearings (not shown). Each of these bearings is connected to the aircraft propulsion system 20 housing by at least one stationary structure such as, for example, an annular support strut.

During operation, air enters the aircraft propulsion system 20 through an airflow inlet 66. This air is directed through the fan section 26 and into the core flowpath 54 and the bypass flowpath 44. The air within the core flowpath 54 may be referred to as "core air". The air within the bypass flowpath 44 may be referred to as "bypass air".

The core air is compressed by the compressor rotors 57 and 58 and directed into a combustion chamber of a combustor in the combustor section 28. Fuel is injected into the combustion chamber and mixed with the compressed core air to provide a fuel-air mixture. This fuel air mixture is ignited and combustion products thereof flow through and sequentially cause the turbine rotors 59 and 60 to rotate. The rotation of the turbine rotors 59 and 60 respectively drive rotation of the compressor rotors 58 and 57 and, thus, compression of the air received from a core airflow inlet. The rotation of the turbine rotor 60 also drives rotation of the fan rotor 56, which propels bypass air through and out of the bypass flowpath 44. The propulsion of the bypass air may account for a majority of thrust generated by the turbine engine 22. The present disclosure, however, is not limited to the exemplary gas turbine engine configuration described above.

Sound waves (e.g., engine noise) generated by the fan rotor 56 as well as other engine components during turbine engine operation may propagate in a downstream direction through the bypass flowpath 44 as well as in an upstream direction through an inlet flowpath 68 formed by an inlet structure 70 of the outer nacelle structure 40. These sound waves, if unmitigated, can be disruptive to people and/or animals within a certain proximity of the aircraft propulsion system 20. Various aircraft propulsion system components forming (e.g., lining) the inlet flowpath 68 and/or the bypass flowpath 44 therefore may be configured with one or more acoustic panels 72 for attenuating the sound waves. An example of such an aircraft propulsion system component is an inner barrel 74 of the inlet structure 70. Other examples of the aircraft propulsion system component include, but are not limited to, an inner panel of a translating sleeve for a thrust reverser and/or a variable area nozzle, a bifurcation panel of the inner nacelle structure 42 and an inner barrel panel of the inner nacelle structure 42. However, for ease of description, the acoustic panel(s) 72 are described below with reference to the inner barrel 74 of the inlet structure 70.

Figure 2:
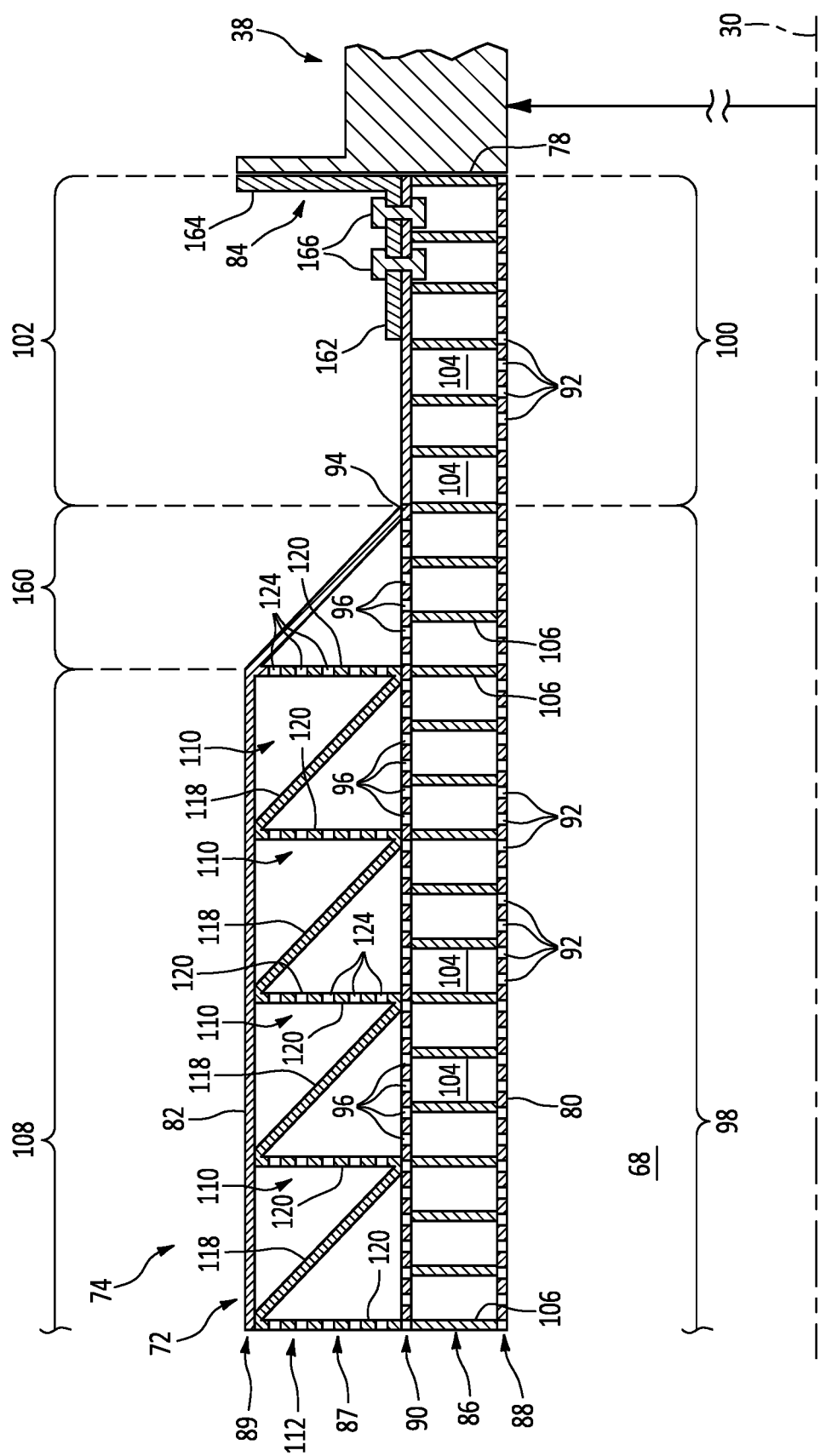
FIG. 2 is a partial sectional illustration of an inner barrel of an inlet structure arranged with an outer case.

The inner barrel 74 of FIG. 1 extends axially along the axial centerline 30 between a forward, upstream end 76 of the inner barrel 74 and an aft, downstream end 78 of the inner barrel 74. The inner barrel 74 extends circumferentially about (e.g., completely around) the axial centerline 30, which may thereby provide the inner barrel 74 with a full-hoop, tubular body. The inner barrel 74 extends radially between and to a radial inner surface 80 of the inner barrel 74 and a radial outer surface 82 of the inner barrel 74. The barrel inner surface 80 forms an outer peripheral boundary of the inlet flowpath 68 within the inlet structure 70. Referring to FIG. 2, the inner barrel 74 includes the one or more acoustic panels 72 (e.g., a single tubular acoustic panel, or an array of arcuate acoustic panels) and a mount 84.

Each acoustic panel 72 of FIG. 2 may be configured as a multi-degree of freedom acoustic panel. For example, the acoustic panel 72 of FIG. 2 is configured as a multi-core structural, acoustic panel with a plurality of cellular cores 86 and 87. This acoustic panel 72 also includes a radial inner perforated (e.g., fluid permeable) face skin 88, a radial outer non-perforated (e.g., fluid impermeable) back skin 89 and a perforated (e.g., fluid permeable) intermediate layer 90; e.g., a septum.

The face skin 88 is configured as an exterior skin of the acoustic panel 72. The face skin 88, for example, may be formed from a relatively thin sheet or layer of material; e.g., a layer of composite material (e.g., a fiber-reinforced polymer), or alternatively sheet metal. This face skin 88 of FIG. 2 extends axially along the axial centerline 30 to (or about) the barrel downstream end 78. The face skin 88 extends circumferentially about (e.g., partially or completely around) the axial centerline 30. The face skin 88 of FIG. 2 forms at least a portion or an entirety of the barrel inner surface 80; see also FIG. 1. The face skin 88 includes a plurality of face skin perforations 92; e.g., apertures such as through-holes. Each of these face skin perforations 92 extends through the face skin 88.

The back skin 89 is configured as an interior skin of the acoustic panel 72. The back skin 89, for example, may be formed from a relatively thin sheet or layer of (e.g., continuous, uninterrupted and/or non-porous) material; e.g., a layer of composite material (e.g., a fiber-reinforced polymer), or alternatively sheet metal. This back skin 89 of FIG. 2 extends axially along the axial centerline 30 to (or about) the barrel downstream end 78. The back skin 89 extends circumferentially about (e.g., partially completely around) the axial centerline 30 and (e.g., partially or completely) circumscribes each of the acoustic panel elements 86-88 and 90. The back skin 89 of FIG. 2 is configured as a continuous, uninterrupted and/or non-porous skin; e.g., a skin without any perforations aligned with the outer cellular core 87.

The intermediate layer 90 is configured as an intra-core septum for the acoustic panel 72. The intermediate layer 90, for example, may be formed from a relatively thin sheet or layer of material; e.g., a layer of composite material (e.g., a fiber-reinforced polymer), or alternatively sheet metal. This intermediate layer 90 of FIG. 2 extends axially along the axial centerline 30 towards the barrel downstream end 78 and, for example, to (or about) an aft, downstream end 94 of the outer cellular core 87, where the outer core downstream end 94 is axially recessed from the barrel downstream end 78. The intermediate layer 90 extends circumferentially about (e.g., partially or completely around) the axial centerline 30 and (e.g., partially or completely) circumscribes each of the acoustic panel elements 86 and 88. The intermediate layer 90 of FIG. 2 includes a plurality of intermediate layer perforations 96; e.g., apertures such as through-holes. Each of these intermediate layer perforations 96 extends through the intermediate layer 90.

The inner cellular core 86 of FIG. 2 extends axially along the axial centerline 30 to (or about) the barrel downstream end 78. The inner cellular core 86 extends circumferentially about (e.g., partially or completely around) the axial centerline 30. The inner cellular core 86 is generally arranged radially between the face skin 88 and the back skin 89. More particularly, referring to FIG. 3A, a forward, upstream section 98 of the inner cellular core 86 extends radially between and to the face skin 88 and the intermediate layer 90. This inner core upstream section 98 is connected (e.g., bonded and/or otherwise attached) to the face skin 88 and the intermediate layer 90. Referring to FIG. 3B, an aft, downstream section 100 of the inner cellular core 86 extends radially between and to the face skin 88 and the back skin 89. This inner core downstream section 100 is connected (e.g., bonded and/or otherwise attached) to the face skin 88 and an aft, downstream section 102 of the back skin 89. The inner core downstream section 100 of FIG. 2 extends axially along the axial centerline 30 between and to the inner core upstream section 98 and the barrel downstream end 78.

Figure 3A:
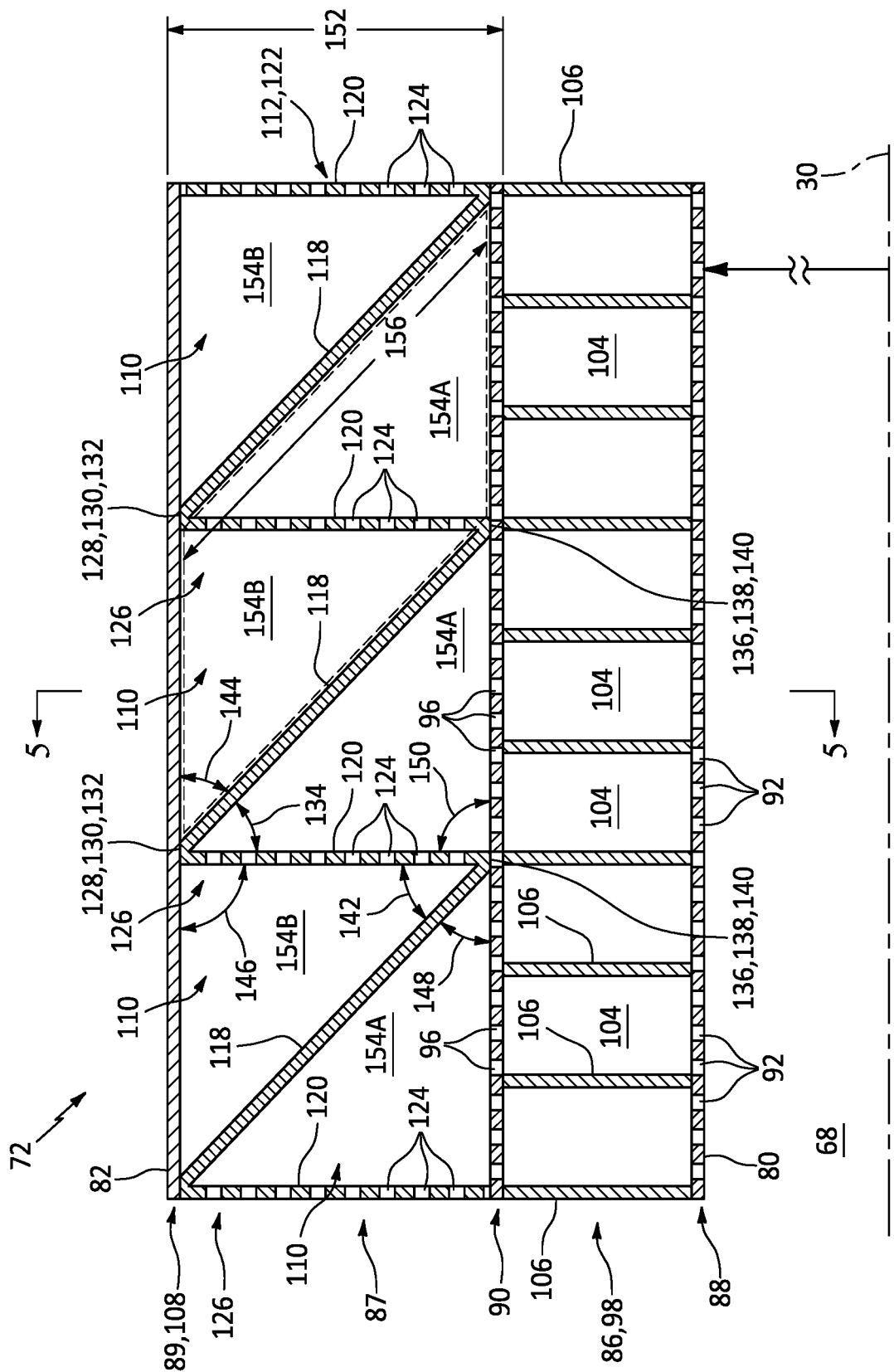
FIG. 3A is a partial sectional illustration of a multi-degree of freedom section of an acoustic panel for the inner barrel configured with baffle and septum panels in an outer cellular core.
Figure 3B:
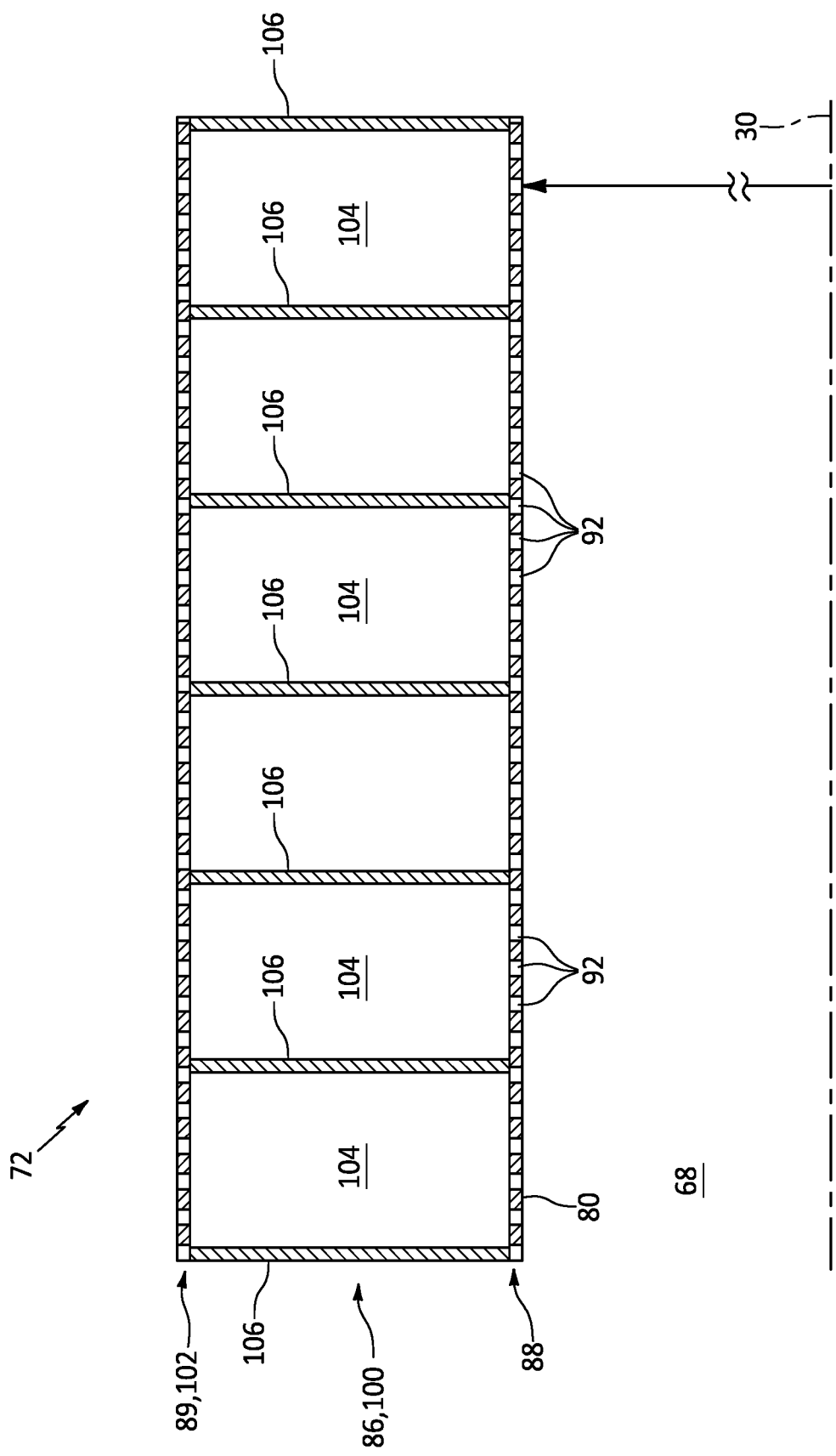
FIG. 3B is a partial sectional illustration of a single-degree of freedom section of the acoustic panel.

The inner cellular core 86 of FIGS. 3A and 3B is configured to form one or more internal inner core chambers 104 (e.g., acoustic resonance chambers, cavities, etc.) radially between the face skin 88 and the intermediate layer 90 or the back skin 89, respectively. The inner cellular core 86 of FIGS. 3A and 3B, for example, includes an inner cellular core structure. This inner cellular core structure may be configured as a honeycomb core structure. The inner cellular core structure of FIG. 4, for example, includes a plurality of corrugated sidewalls 106. These corrugated sidewalls 106 are arranged in a side-by-side array and are connected to one another such that each adjacent (e.g., neighboring) pair of the corrugated sidewalls 106 forms an array of the inner core chambers 104 laterally therebetween. The inner cellular core structure and its corrugated sidewalls 106 are constructed from or otherwise include core material such as metal; e.g., sheet metal. The present disclosure, however, is not limited to such an exemplary core material.

Each of the inner core chambers 104 of FIG. 3A extends radially within/through the inner cellular core 86 and its upstream section 98 between and to the face skin 88 and the intermediate layer 90. One or more or all of the inner core chambers 104 in the inner core upstream section 98 may thereby each be fluidly coupled with a respective set of one or more of the face skin perforations 92 and a respective set of one or more of the intermediate layer perforations 96. Each of the inner core chambers of FIG. 3B extends radially within/through the inner cellular core 86 and its downstream section 100 between and to the face skin 88 and the back skin 89.

Each of the inner core chambers 104 has a first inner core chamber sectional geometry (e.g., shape, size, etc.) when viewed in a first inner core chamber reference plane; e.g., the plane of FIG. 3A, 3B. This first inner core chamber sectional geometry may have a polygonal shape; e.g., a rectangular shape. Referring to FIG. 4, each of the inner core chambers 104 has a second inner core chamber sectional geometry (e.g., shape, size, etc.) when viewed in a second inner core chamber reference plane; e.g., the plane of FIG. 4. This second inner core chamber sectional geometry may have a polygonal shape; e.g., a hexagonal shape. The present disclosure, however, is not limited to foregoing exemplary inner cellular core configuration. For example, one or more or all of the inner core chambers 104 may each have a circular, elliptical or other non-polygonal cross-sectional geometry. Furthermore, various other types of honeycomb cores and, more generally, various other types of cellular cores for an acoustic panel are known in the art, and the present disclosure is not limited to any particular ones thereof.

The outer cellular core 87 of FIG. 2 extends axially along the axial centerline 30 to its outer core downstream end 94. The outer cellular core 87 extends circumferentially about (e.g., partially or completely around) the axial centerline 30. The outer cellular core 87 of FIG. 3A is arranged radially between the intermediate layer 90 and a forward, upstream section 108 of the back skin 89. The outer cellular core 87 of FIG. 3A, more particularly, extends radially between and to the intermediate layer 90 and the back skin 89. The outer cellular core 87 is connected (e.g., bonded and/or otherwise attached) to the intermediate layer 90 and/or the back skin upstream section 108.

The outer cellular core 87 is configured to form one or more internal outer core chambers 110 (e.g., acoustic resonance chambers, cavities, etc.) radially between the intermediate layer 90 and the back skin 89 and its upstream section 108. Each of these outer core chambers 110 may extend radially within/through the outer cellular core 87 between and to the intermediate layer 90 and the back skin 89 and its upstream section 108. One or more or all of the outer core chambers 110 may thereby each be fluidly coupled with a respective set of one or more of the intermediate layer perforations 96. Thus, one or more or all of the outer core chambers 110 may be fluidly coupled with a respective set of one or more of the inner core chambers 104 in the inner core upstream section 98 through the respective intermediate layer perforations 96. However, while each outer core chamber 110 of FIG. 3A may be fluidly coupled with multiple inner core chambers 104, each inner core chamber 104 in the inner core upstream section 98 may only be fluidly coupled with a single one of the outer core chambers 110. For example, while each outer core chamber 110 may axially (see FIG. 3A) and/or circumferentially (see FIG. 5) overlap multiple inner core chambers 104, each inner core chamber 104 may only axially (see FIG. 3A) and/or circumferentially (see FIG. 5) overlap a single one of the outer core chambers 110. The present disclosure, however, is not limited to such an exemplary relationship between the inner and the outer cellular cores 86 and 87.

Figure 5:
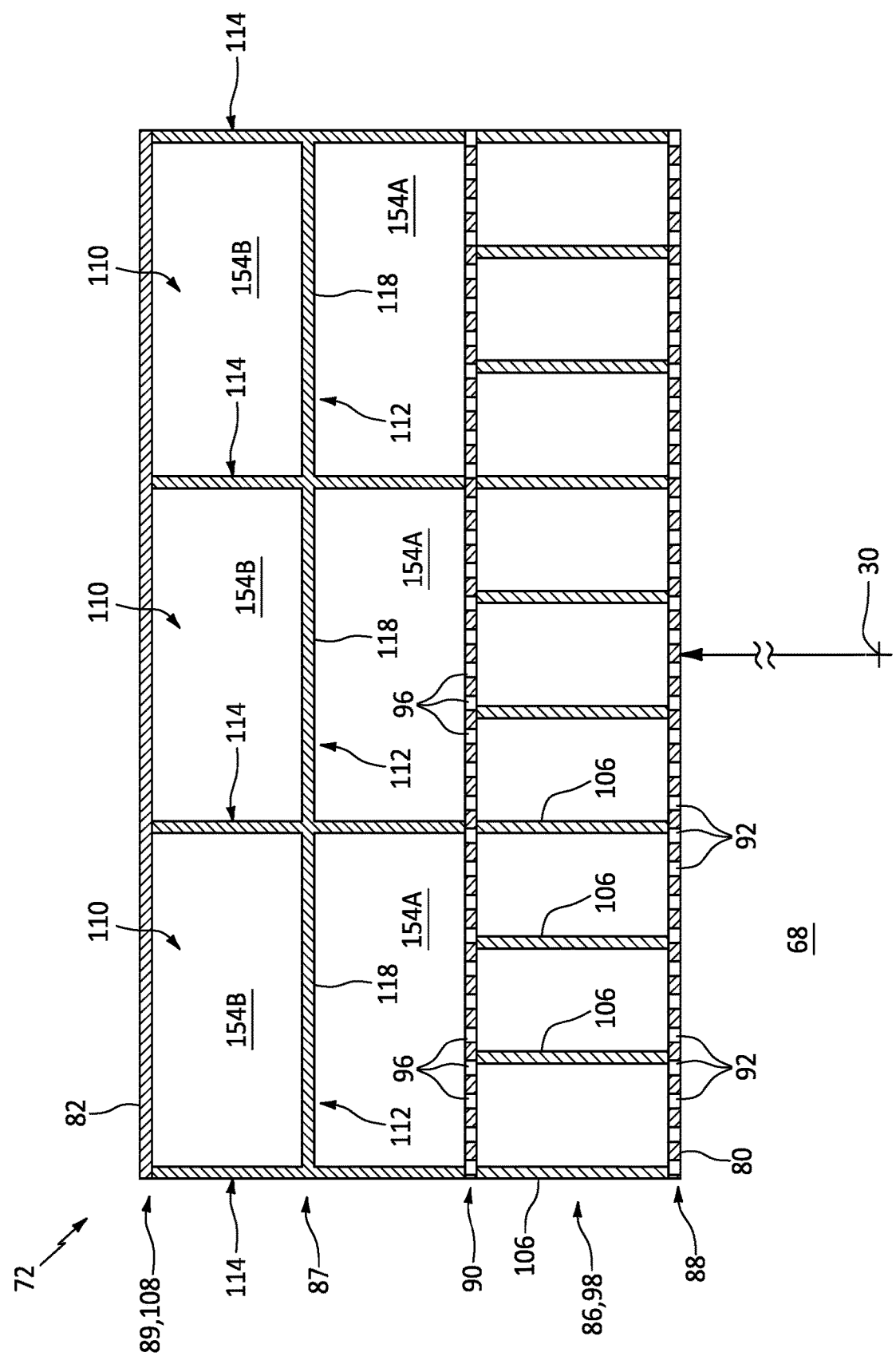
FIG. 5 is a partial sectional illustration of the acoustic panel taken along line 5-5 in FIG. 3A.
Figure 6:
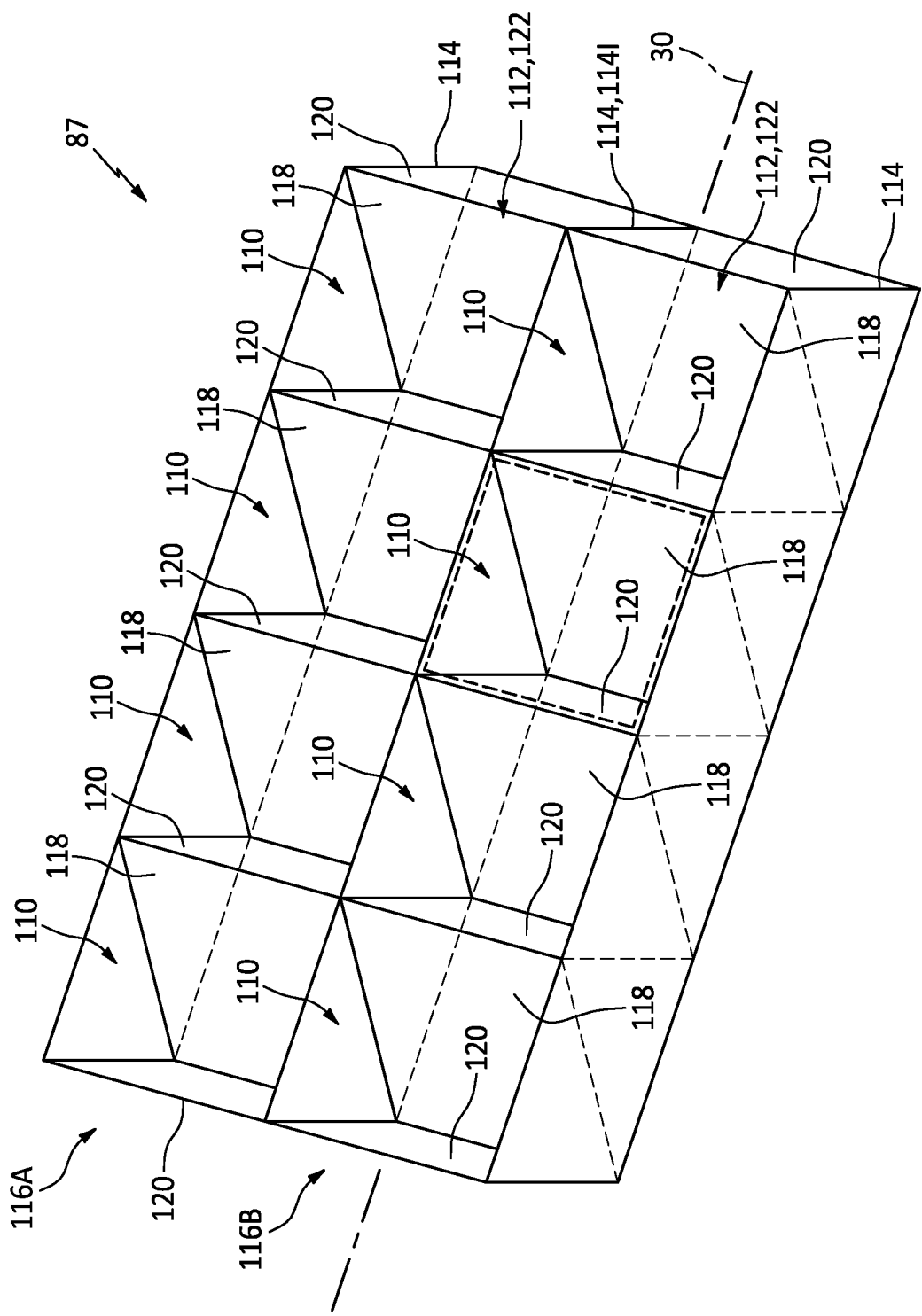
FIG. 6 is a partial perspective illustration of the outer cellular core for the acoustic panel, which core is shown without perforations for ease of illustration.

Referring to FIGS. 3A, 5 and 6, the outer cellular core 87 includes one or more corrugated structures 112 and one or more (e.g., planar) chamber sidewalls 114 (see FIGS. 5 and 6). These outer core components 112 and 114 are arranged together to provide the outer core chambers 110. The outer core chambers 110 of FIG. 6 are arranged in one or more linear chamber arrays 116A and 116B (generally referred to as "116"), where each chamber array 116 of FIG. 6 may extend axially along the axial centerline 30 (or alternatively in a circumferential direction). Each chamber array 116 includes a plurality of the outer core chambers 110.

The chamber sidewalls 114 of FIGS. 5 and 6 may be arranged parallel with one another. The chamber sidewalls 114 are spaced laterally (e.g., circumferentially) from one another so as to respectively form the outer core chambers 110 laterally between the chamber sidewalls 114. Each of the chamber sidewalls 114 thereby respectively forms lateral peripheral sides of the outer core chambers 110 in at least one of the chamber arrays 116. Each intermediate sidewall (e.g., 114I) (e.g., a chamber sidewall laterally disposed between two other chamber sidewalls), for example, forms the lateral peripheral sides of the respective outer core chambers 110 in a first of the chamber arrays 116 (e.g., 116A) as well as the lateral peripheral sides of the respective outer core chambers 110 in a second of the chamber arrays 116 (e.g., 116B) that laterally neighbors (e.g., is immediately adjacent, next to) the first of the chamber arrays 116 (e.g., 116A). Each intermediate sidewall (e.g., 114I) is located laterally between the respective laterally neighboring pair of chamber arrays 116 (e.g., the first and the second chamber arrays 116A and 116B). Each intermediate sidewall (e.g., 114I) may therefore fluidly separate the outer core chambers 110 in the respective laterally neighboring pair of chamber arrays 116 (e.g., 116A and 116B) from one another.

Referring to FIG. 5, each of the chamber sidewalls 114 extends vertically between and to the intermediate layer 90 and the back skin 89. Each of the chamber sidewalls 114 may also be connected (e.g., bonded and/or otherwise attached) to the intermediate layer 90 and/or the back skin 89. Each of the chamber sidewalls 114 may be orientated substantially perpendicular to the intermediate layer 90 and the back skin 89.

Each corrugated structure 112 of FIGS. 3A and 6 includes one or more first panels 118 (e.g., members, segments, etc.) and one or more second panels 120 (e.g., members, segments, etc.). These corrugated structure panels 118 and 120 are arranged together and are interconnected (e.g., in a zig-zag pattern) to provide a corrugated ribbon 122 (see also FIG. 8); e.g., a longitudinally elongated corrugated panel, layer, body, etc. The first panels 118 of FIG. 3A are configured as baffles; e.g., non-perforated (e.g., fluid impermeable) segments of the corrugated ribbon 122. The second panels 120 of FIG. 3A are configured as septums; e.g., perforated (e.g., fluid permeable) segments of the corrugated ribbon 122. Each of these second panels 120, for example, includes one or more panel perforations 124; e.g., apertures such as through-holes. Each of these panel perforations 124 extends through the respective second panel 120. However, referring to FIG. 7, one or more or all of the second panels 120 may alternatively each be configured as another baffle; e.g., another fluid impermeable (e.g., non-perforated) segment of the corrugated ribbon 122.

Figure 8:
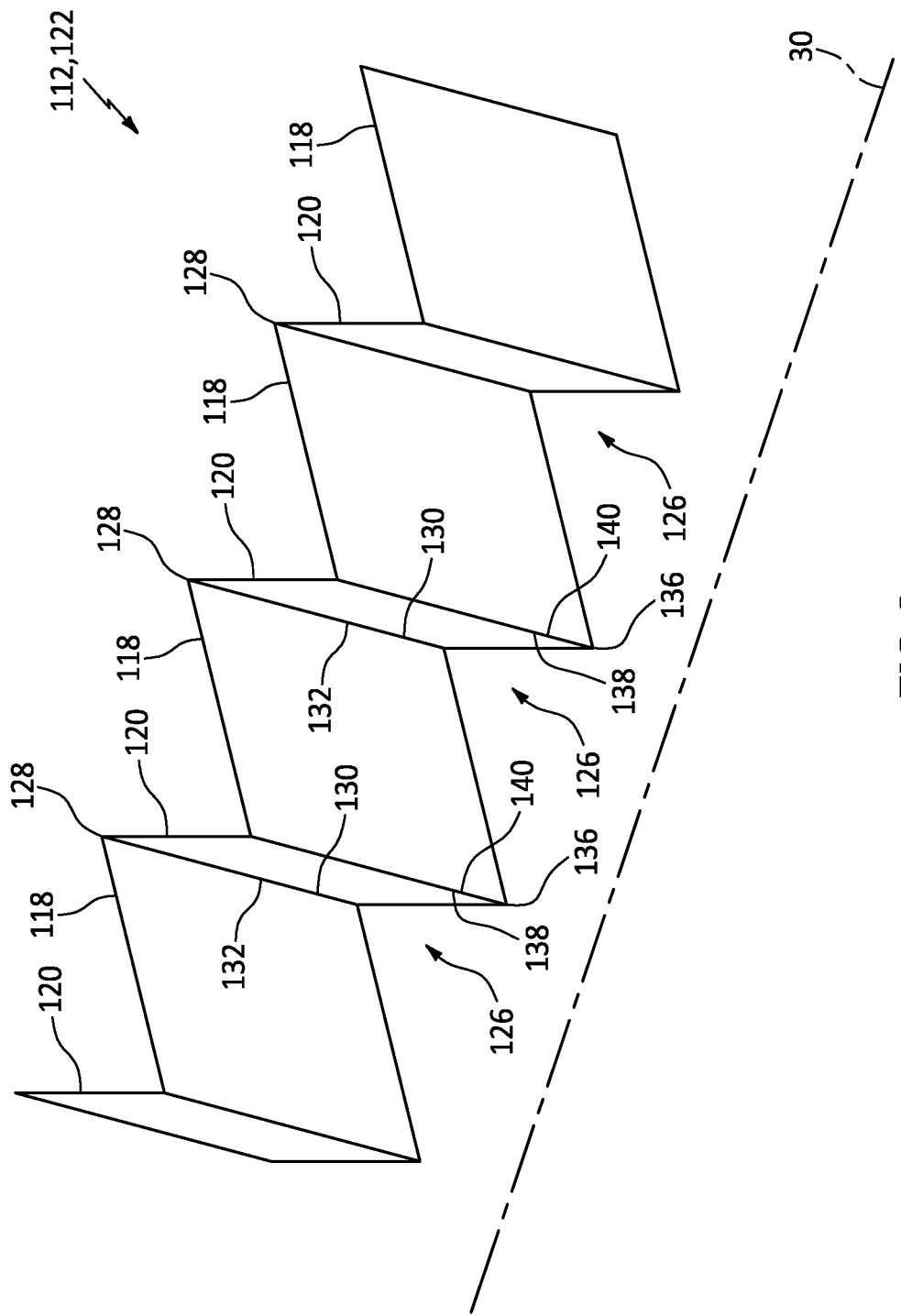
FIG. 8 is a partial perspective illustration of a corrugated ribbon for the outer cellular core, which ribbon is shown without perforations for ease of illustration.

Referring to FIG. 8, the first panels 118 (e.g., the baffles) and the second panels 120 (e.g., the septums) are arranged together into a longitudinally extending linear array to provide the respective corrugated ribbon 122. The first panels 118 are interspersed with the second panels 120. Each first panel 118 (unless configured at a longitudinal end of the chamber sidewall 114; see FIG. 6), for example, is disposed and may extend longitudinally between and to a respective longitudinally neighboring pair of the second panels 120. Similarly, each second panel 120 (unless configured at a longitudinal end of the chamber sidewall 114; see FIG. 6) is disposed and may extend longitudinally between and to a respective longitudinally neighboring pair of the first panels 118.

The corrugated structure 112 of FIG. 8 includes one or more corrugations 126. Each of these corrugations 126 includes a longitudinally neighboring pair of the first and second panels 118 and 120.

Referring to FIG. 3A, within the same corrugation 126, each first panel 118 is connected to and may meet a respective second panel 120 at a peak 128 adjacent the back skin 89. Each first panel 118, for example, extends to a first end 130 thereof. Each second panel 120 extends to a first end 132 thereof. Each first panel first end 130 is (e.g., directly) connected to the first end 132 of the second panel 120 in the same corrugation 126 at the back skin peak 128; see also FIG. 8. The first panel 118 is angularly offset from the respective second panel 120 by an included angle 134; e.g., an acute angle. This back skin peak angle 134 of FIG. 3A, for example, may be between twenty degrees (20°) and seventy degrees (70°); e.g., thirty degrees (30°), forty-five degrees (45°), seventy degrees (70°). The present disclosure, however, is not limited to such an exemplary back skin peak angle.

Each first panel 118 is connected to and may meet the second panel 120 in a longitudinally neighboring corrugation 126 at a peak 136 adjacent the intermediate layer 90. Each first panel 118, for example, extends to a second end 138 thereof. Each second panel 120 extends to a second end 140 thereof. Each first panel second end 138 is (e.g., directly) connected to the second end 140 of the second panel 120 in the longitudinally neighboring corrugation 126 at the intermediate layer peak 136; see also FIG. 8. The first panel 118 is angularly offset from the respective second panel 120 by an included angle 142; e.g., an acute angle. This intermediate layer peak angle 142 may be equal to or otherwise complementary with the back skin peak angle 134. The intermediate layer peak angle 142 of FIG. 3A, for example, may be between twenty degrees (20°) and seventy degrees (70°); e.g., thirty degrees (30°), forty-five degrees (45°), seventy degrees (70°). The present disclosure, however, is not limited to such an exemplary intermediate layer peak angle.

Each corrugation 126 at its back skin peak 128 radially engages (e.g., contacts) and may be connected (e.g., bonded and/or otherwise attached) to the back skin 89. Each first panel 118 is angularly offset from the back skin 89 by a back skin-first panel included angle 144; e.g., an acute angle. The back skin-first panel included angle 144 of FIG. 3A, for example, may be between twenty degrees (20°) and seventy degrees (70°); e.g., thirty degrees (30°), forty-five degrees (45°), seventy degrees (70°). Each second panel 120 is angularly offset from the back skin 89 by a back skin-second panel included angle 146; e.g., a right angle. The present disclosure, however, is not limited to such exemplary angles. For example, in other embodiments, the back skin-second panel included angle 146 may be an acute angle equal to or different than the back skin-first panel included angle 144.

Each corrugation 126 at one or each of its intermediate layer peaks 136 radially engages (e.g., contacts) and may be connected (e.g., bonded and/or otherwise attached) to the intermediate layer 90. Each first panel 118 is angularly offset from the intermediate layer 90 by an intermediate layer-first panel included angle 148; e.g., an acute angle. The intermediate layer-first panel included angle 148 of FIG. 3A, for example, may be between twenty degrees (20°) and seventy degrees (70°); e.g., thirty degrees (30°), forty-five degrees (45°), seventy degrees (70°). Each second panel 120 is angularly offset from the intermediate layer 90 by an intermediate layer-second panel included angle 150; e.g., right angle. The present disclosure, however, is not limited to such exemplary angles. For example, in other embodiments, the intermediate layer-second panel included angle 150 may be an acute angle equal to or different than the intermediate layer-first panel included angle 148.

With the foregoing configuration, each corrugated structure 112 and each of its corrugations 126 extend across a radial height 152 of the outer cellular core 87 between the back skin 89 and the intermediate layer 90. Each corrugated structure 112 may thereby divide the one or more outer core chambers 110 within a respective chamber array 116 into one or more first sub-chambers 154A (e.g., cavities) and one or more corresponding second sub-chambers 154B (e.g., cavities). The first sub-chambers 154A of FIG. 3A are located within the outer cellular core 87 on an inner side (e.g., intermediate layer side) of the respective corrugated structure 112. The second sub-chambers 154B are located within the outer cellular core 87 on an outer side (e.g., back skin side) of the respective corrugated structure 112.

Each of the first sub-chambers 154A of FIG. 3A is fluidly coupled with a respective one of the second sub-chambers 154B through the respective panel perforations 124. Each respective set of fluidly coupled sub-chambers 154A and 154B collectively forms a respective one of the outer core chambers 110 within the outer cellular core 87. Each outer core chamber 110 of FIG. 3A extends diagonally (e.g., radially and longitudinally) from the back skin 89, along a respective neighboring pair of the first panels 118 and through a respective second panel 120 (via the respective panel perforations 124), to the intermediate layer 90. Each outer core chamber 110 of FIG. 3A extends longitudinally (e.g., axially), along each of the acoustic panel elements 89, 90 and 114, between and to the respective neighboring pair of the first panels 118. Each outer core chamber 110 of FIG. 5 extends laterally (e.g., circumferentially), along each of the first and the second panels 118 and 120 (see FIG. 6), between and to a respective neighboring pair of the chamber sidewalls 114.

With the foregoing configuration, the respective outer core chamber 110 of FIG. 3A may have a length 156 within the outer cellular core 87 that is longer than the outer core height 152. This may facilitate tuning the outer cellular core 87 and, more generally, the acoustic panel 72 for attenuating sound (e.g., noise) with relatively low frequencies without changing (e.g., proportionally increasing) an overall radial height of the acoustic panel 72 as may be required via a traditional acoustic panel only with a honeycomb core.

Each of the outer core chambers 110 of FIG. 3A has a first outer core chamber sectional geometry (e.g., shape, size, etc.) when viewed in a first outer core chamber reference plane (e.g., the plane of FIG. 3A), which plane may be parallel with (e.g., co-planar with) the first inner core chamber reference plane described above. The first outer core chamber sectional geometry may have a polygonal shape; e.g., a parallelogram shape (see dashed line box). Referring to FIG. 6, each of the outer core chambers 110 has a second outer core chamber sectional geometry (e.g., shape, size, etc.) when viewed in a second outer core chamber reference plane, which plane may be perpendicular to the first outer core chamber reference plane and/or parallel with (but, radially spaced from) the second inner core chamber reference plane described above. This second outer core chamber sectional geometry may have a polygonal shape; e.g., a rectangular shape (see dashed line box). The present disclosure, however, is not limited to foregoing exemplary outer cellular core configuration. Furthermore, various other types of cellular cores for an acoustic panel are known in the art, and the present disclosure is not limited to any particular ones thereof.

Figure 9:
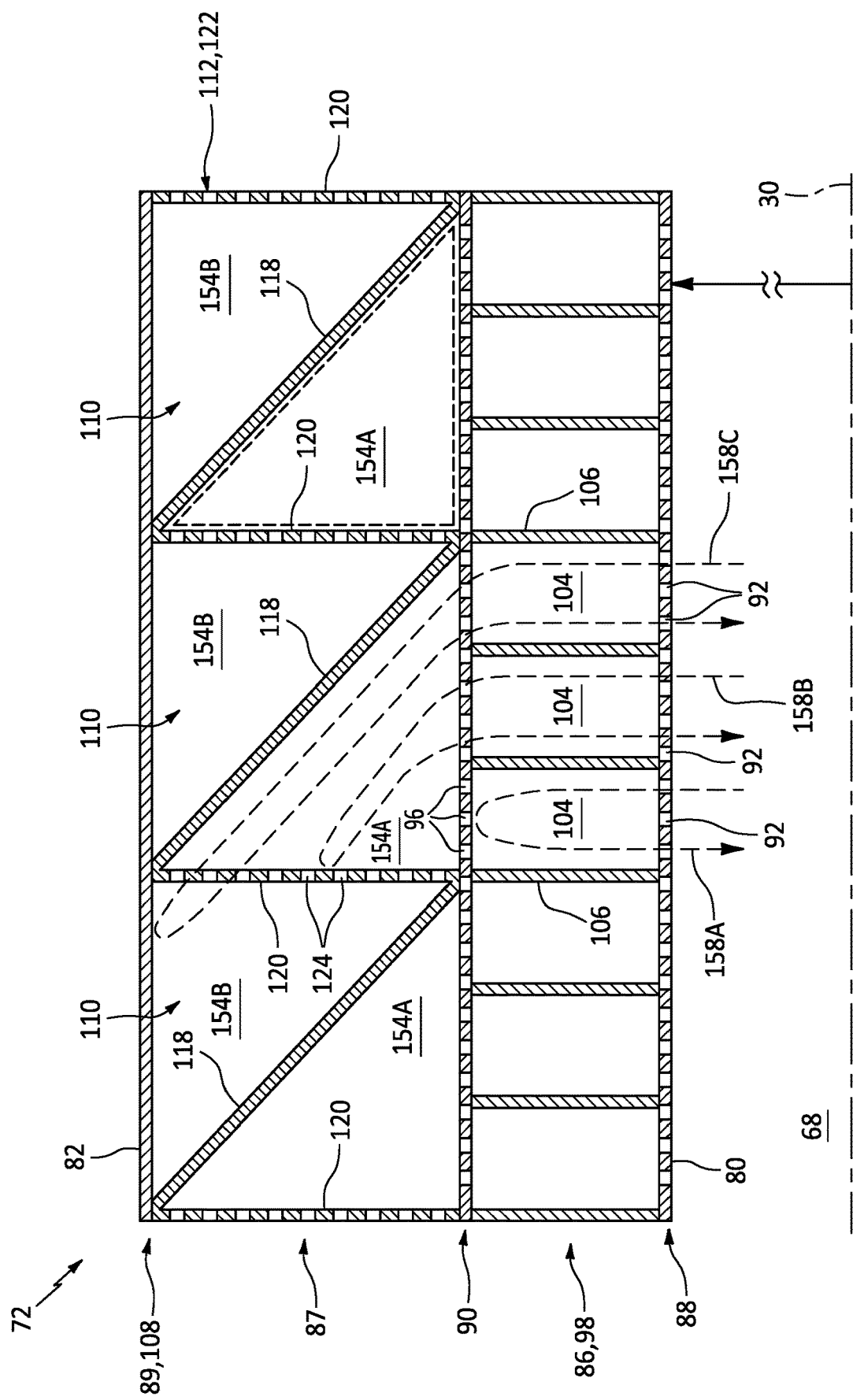
FIG. 9 is a partial sectional illustration of the multi-degree of freedom section of the acoustic panel of FIG. 3A depicted with select sound wave trajectories.

An upstream section of the acoustic panel 72 of FIGS. 2 and 3A is configured as a multi-degree of freedom (MDOF) acoustic panel section, whereas a downstream section of the acoustic panel 72 of FIGS. 2 and 3B is configured as a single-degree of freedom (SDOF) acoustic panel section. Referring to FIG. 9, sound waves entering the MDOF acoustic panel section may follow a plurality of trajectories 158A-C (generally referred to as "158"), select examples of such trajectories are schematically illustrated. These trajectories 158 are included to depict which chambers 104, 110/sub-chambers 154A, 154B are involved, rather than depicting specific sound wave paths. The sound waves, of course, may also follow one or more additional trajectories not shown in FIG. 9. For example, one or more additional sound wave trajectories may exist due to interactions between the chambers/sub-chambers that produce additional reflections.

The first trajectory 158A extends away from the respective face skin perforations 92, is reversed by the intermediate layer 90 (e.g., a septum layer), and extends back to the respective face skin perforations 92. The second trajectory 158B extends away from the respective face skin perforations 92 and through the respective intermediate layer perforations 96, is reversed by the respective corrugated structure 112 (e.g., solid, non-interrupted portion(s) of the respective second panel 120), and extends back through the respective intermediate layer perforations 96 to the respective face skin perforations 92. The third trajectory 158C extends away from the respective face skin perforations 92 and sequentially through the respective intermediate layer perforations 96 and the respective panel perforations 124, is reversed by the back skin 89, and extends back sequentially through the respective panel perforations 124 and the respective intermediate layer perforations 96 to the respective face skin perforations 92. With such an arrangement, the acoustic panel 72 may reverse phase of a plurality of different frequencies of the sound waves using known acoustic reflection principles and subsequently direct the reverse phase sound waves out of the acoustic panel 72 through the face skin perforations 92 to destructively interfere with other incoming sound waves; e.g., noise waves.

One or more or all of the outer cellular core components 112 and 114 may be formed from composite material (e.g., a fiber-reinforced polymer), or alternatively metal. The outer cellular core components 112 and 114, for example, may be laid up and formed from composite material as a monolithic body. The present disclosure, however, is not limited to the foregoing exemplary materials or formation techniques.

Referring to FIG. 2, an intermediate section 160 of the back skin 89 is axially between and interconnects the back skin upstream section 108 to the back skin downstream section 102. The back skin intermediate section 160 of FIG. 2, for example, extends diagonally (e.g., axially aft and radially inward) from the back skin upstream section 108 to the back skin downstream section 102, where the back skin 89 meets and is connected to the inner cellular core 86. With this arrangement, a continuous sheet of material—the back skin material—may extend axially along and provide a continuous structural reinforcement/backing for the inner cellular core 86 and the outer cellular core 87. Here, the intermediate layer 90 may terminate at the outer core downstream end 94 so as not to provide an intermediate member between the back skin 89 and the inner core downstream section 100.

The mount 84 is configured to secure the inner barrel 74 and its acoustic panel 72 to another component of the aircraft propulsion system; e.g., the outer case 38 of FIG. 1. This mount 84 may be configured as an A-flange. The mount 84 of FIG. 2, for example, includes a mount base 162 and a mount flange 164. The mount base 162 extends axially along and circumferentially about (e.g., partially or completely around) the axial centerline 30. The mount base 162 is attached to the inner barrel 74 and its acoustic panel 72. The mount base 162 of FIG. 2, for example, is mechanically fastened to the back skin 89 and its downstream section 102 with one or more fasteners 166. Each of these fasteners 166 may project through the back skin 89 and partially into the inner core downstream section 100. Each of the fasteners 166, for example, may be configured as a composi-lok fastener. The mount flange 164 is arranged at (e.g., on, adjacent or proximate) the barrel downstream end 78. The mount flange 164 is connected to (e.g., formed integral with) the mount base 162. The mount flange 164 of FIG. 2 projects radially out from the mount base 162 to a radial outer distal end of the mount flange 164. This mount flange 164 extends circumferentially about (e.g., partially or completely around) the axial centerline 30 and (e.g., partially or completely) circumscribes the mount base 162. With such an arrangement, the mount 84 may structurally tie the acoustic panel 72 and its structurally robust back skin 89 to the outer case 38 (see FIG. 1) to the without, for example, imparting additional loads on other acoustic panel components (e.g., 86-88 and 90). Of course, in other embodiments, one or more of the fasteners 164 may alternatively each be configured as a thru-fastener which extends radially through or otherwise into the acoustic panel 72 and each of its elements 86, 88 and 89.

Figure 7:
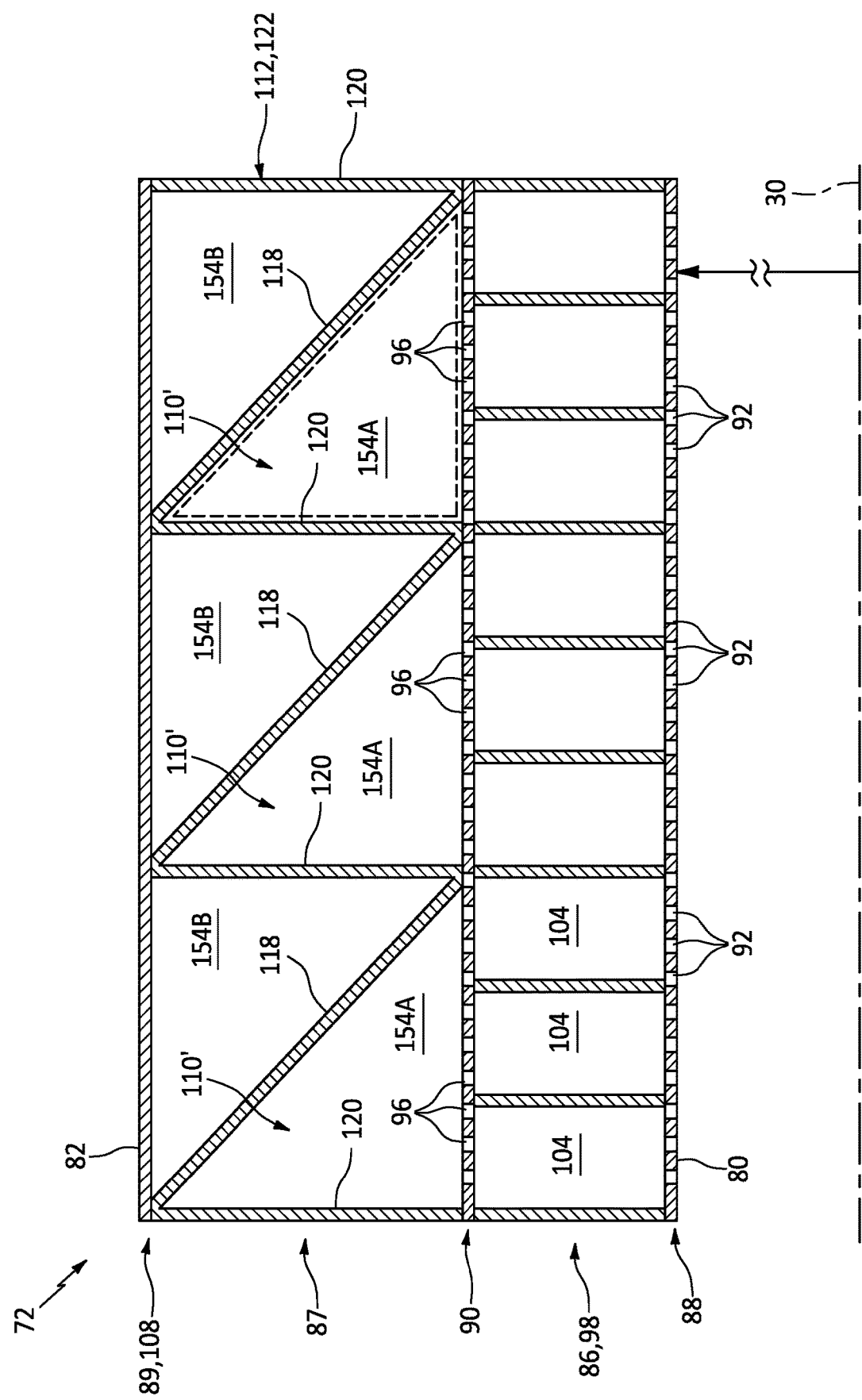
FIG. 7 is a partial sectional illustration of the multi-degree of freedom section of the acoustic panel configured with baffle panels in the outer cellular core.

In some embodiments, referring to FIG. 7, one or more or all of the second panels 120 may each be configured as another baffle; e.g., another fluid impermeable (e.g., non-perforated) segment of the corrugated ribbon 122. Each second panel 120 of FIG. 7 thereby fluidly decouples (e.g., separates, divides, etc.) the respective inner and outer sub-chambers 154A and 154B. With such an arrangement, each outer core chamber 110' (e.g., the sub-chamber 154A) of FIG. 7 extends radially between and to the intermediate layer 90 and the respective first panel 118. Each outer core chamber 110' (e.g., the sub-chamber) of FIG. 7 extends longitudinally (e.g., axially) between the respective neighboring first and second panels 118 and 120. The first outer core chamber sectional geometry of FIG. 7 may thereby have a triangular shape (see dashed line box) rather than a parallelogram shape as in the embodiments of FIG. 3A.

The acoustic panel 72 is described above with different cellular core configurations. However, in other embodiments, the inner cellular core 86 and the outer cellular core 87 may be configured with a common or similar configuration. For example, both the inner cellular core 86 and the outer cellular core 87 may each be configured with a honeycomb core structure (e.g., see FIG. 4), a corrugated structure (e.g., see FIG. 6) or any other cellular core structure.

While the acoustic panel 72 is described above as part of the inner barrel 74, the acoustic panel 72 of the present disclosure is not limited to such an exemplary application. The acoustic panel 72 of the present disclosure, for example, may be configured for sound attenuation in other structures of the aircraft propulsion system. The acoustic panel 72 may also or alternatively be arranged in other orientations where, for example, the face skin 88 forms an inner peripheral boundary or a side peripheral boundary of a flowpath. Furthermore, the acoustic panel 72 and its components are not limited to the specific materials and/or construction techniques described above.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An apparatus for an aircraft propulsion system, comprising:
   an acoustic panel including a perforated face skin, a back skin, a perforated intermediate layer, a first cellular core and a second cellular core;
   the first cellular core including a first section and a second section, the first section between and connected to the perforated face skin and the perforated intermediate layer, and the second section between and connected to the perforated face skin and the back skin, wherein the perforated intermediate layer extends longitudinally to an interface between the second section and the back skin;
   the second cellular core between and connected to the perforated intermediate layer and the back skin; and
   a mount attached to the back skin along the second section.

2. The apparatus of claim 1, wherein the mount is attached to the back skin by a plurality of fasteners.

3. The apparatus of claim 2, wherein a first of the plurality of fasteners projects partially into the second section from the back skin.

4. The apparatus of claim 1, wherein the mount comprises a flange.

5. The apparatus of claim 1, wherein
   the first cellular core comprises a plurality of first core chambers, and a first of the plurality of first core chambers in the first section is fluidly coupled with one or more first perforations in the perforated face skin and one or more first perforations in the perforated intermediate layer; and
   the second cellular core comprises a plurality of second core chambers, and a first of the plurality of second core chambers is fluidly coupled with the first of the plurality of first core chambers through the one or more first perforations in the perforated intermediate layer.

6. The apparatus of claim 5, wherein
   a second of the plurality of first core chambers is fluidly coupled with one or more second perforations in the perforated face skin and one or more second perforations in the perforated intermediate layer; and
   the first of the plurality of second core chambers is fluidly coupled with the second of the plurality of first core chambers through the one or more second perforations in the perforated intermediate layer.

7. The apparatus of claim 5, wherein
   the first of the plurality of first core chambers is configured with a first chamber sectional geometry in a first chamber reference plane;
   the first of the plurality of second core chambers is configured with a second chamber sectional geometry in a second chamber reference plane that is parallel with the first chamber reference plane; and
   the second chamber sectional geometry is different than the first chamber sectional geometry.

8. The apparatus of claim 7, wherein the first chamber sectional geometry comprises a rectangular shape; and
   the second chamber sectional geometry comprises a parallelogram shape.

9. The apparatus of claim 7, wherein
   the first chamber sectional geometry comprises a hexagonal shape; and
   the second chamber sectional geometry comprises a rectangular shape.

10. The apparatus of claim 1, wherein
    the second cellular core comprises a plurality of corrugations;
    a first of the plurality of corrugations comprises a first panel and a second panel;
    the first of the plurality of corrugations is connected to the back skin at an interface between the first panel and the second panel;
    the first panel is connected to the perforated intermediate layer at a first location; and
    the second panel is connected to the perforated intermediate layer at a second location.

11. The apparatus of claim 10, wherein
    the first panel is angularly offset from the back skin by an acute angle; and
    the second panel is angularly offset from the first panel at the interface between the first panel and the second panel by an acute angle.

12. The apparatus of claim 10, wherein
    the first panel is configured as a non-perforated panel; and
    the second panel is configured as a perforated panel.

13. The apparatus of claim 1, wherein the first cellular core comprises a honeycomb core.

14. The apparatus of claim 1, further comprising a nacelle inner barrel comprising the acoustic panel.

15. The apparatus of claim 1, further comprising:
    a fan case;
    the acoustic panel next to the fan case, and the acoustic panel connected to the fan case through the mount.

16. An apparatus for an aircraft propulsion system, comprising:
    an inner barrel including a multi-degree of freedom acoustic panel and a mount;
    the multi-degree of freedom acoustic panel including a back skin, a first cellular core and a second cellular core that axially and circumferentially overlaps the first cellular core;

a first section of the back skin connected to and contacting the first cellular core, and a second section of the back skin connected to and contacting the second cellular core;

the first cellular core comprising a plurality of first core chambers, and a first of the plurality of first core chambers configured with a first chamber sectional geometry in a first chamber reference plane;

the second cellular core comprising a plurality of second core chambers, a first of the plurality of second core chambers configured with a second chamber sectional geometry in a second chamber reference plane that is parallel with the first chamber reference plane, and the second chamber sectional geometry different than the first chamber sectional geometry; and the mount attached to the back skin.

17. The apparatus of claim 16, wherein the multi-degree of freedom acoustic panel further includes an intermediate layer, and the intermediate layer is between and contacts the first cellular core and the second cellular core.

18. The apparatus of claim 16, wherein the multi-degree of freedom acoustic panel further includes an intermediate layer, and the intermediate layer extends longitudinally to an interface between a section of the second cellular core and the back skin.

* * * * *